US009923487B2

(12) United States Patent
Bixel (10) Patent No.: US 9,923,487 B2
(45) Date of Patent: Mar. 20, 2018

(54) HYBRID POWER CONVERTER FOR RENEWABLE ENERGY POWER PLANT

(71) Applicant: TMEIC Corporation, Roanoke, VA (US)

(72) Inventor: Paul S. Bixel, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 797 days.

(21) Appl. No.: 14/252,100

(22) Filed: Apr. 14, 2014

(65) Prior Publication Data

US 2015/0295513 A1    Oct. 15, 2015

(51) Int. Cl.
*H02J 3/32* (2006.01)
*H02J 7/35* (2006.01)
*H02M 7/5387* (2007.01)
*H02J 3/00* (2006.01)

(52) U.S. Cl.
CPC ........... *H02M 7/5387* (2013.01); *H02J 3/005* (2013.01); *H02J 3/32* (2013.01); *H02J 7/35* (2013.01); *Y02E 10/563* (2013.01); *Y02E 10/566* (2013.01); *Y02P 90/50* (2015.11)

(58) Field of Classification Search
CPC .. H02J 3/005; H02J 7/0068; H02J 7/35; H02J 7/34; H02J 1/14; H02M 7/5387; Y02E 10/563; Y02E 10/566; Y10T 307/344; Y10T 307/516; Y10T 307/527
See application file for complete search history.

(56) References Cited

U.S. PATENT DOCUMENTS

| 7,411,308 | B2 | 8/2008 | Parmley | |
|---|---|---|---|---|
| 7,906,934 | B2 * | 3/2011 | Inoue | H02J 7/35 320/101 |
| 8,344,550 | B2 | 1/2013 | Delmerico et al. | |
| 8,482,155 | B2 | 7/2013 | Choi et al. | |
| 8,587,251 | B2 * | 11/2013 | Nakashima | H01L 31/02021 320/101 |
| 8,994,217 | B2 * | 3/2015 | Cho | H01M 10/465 307/82 |

(Continued)

FOREIGN PATENT DOCUMENTS

| CN | 102769302 A | 11/2012 |
|---|---|---|
| CN | 103296695 A | 9/2013 |

(Continued)

*Primary Examiner* — Ryan Johnson
(74) *Attorney, Agent, or Firm* — New River Valley IP Law, PC; Michele L. Mayberry; Timothy D. Nolan (57) ABSTRACT

A hybrid power converter system that comprises a first power bus connected to a DC power source, a second power bus connected to an AC load, and a third power bus connected to an energy storage device. One or more power converters are connected to the first power bus in parallel and are connected with the second and third power buses, each by a switch. The system includes a first switch for connecting or disconnecting a power converter to or from the second power bus and a second switch for connecting or disconnecting the power converter to or from the third power bus, to switch the source of power being provided to the AC load either from the DC power source or the energy storage device. With additional power converters connected into the system in a similar manner, several combinations of power supply are possible.

11 Claims, 4 Drawing Sheets

(56) References Cited

U.S. PATENT DOCUMENTS

| | | | |
|---|---|---|---|
| 2009/0189445 A1 | 7/2009 | Strizki | |
| 2011/0095606 A1 | 4/2011 | Ou | |
| 2011/0137481 A1 | 6/2011 | Manz et al. | |
| 2012/0013190 A1 | 1/2012 | Chang et al. | |
| 2012/0013192 A1 | 1/2012 | Park et al. | |
| 2012/0313436 A1 | 12/2012 | Hsu et al. | |
| 2013/0051105 A1 | 2/2013 | Wang et al. | |
| 2013/0062953 A1* | 3/2013 | Nurmi | H02J 3/32 307/72 |
| 2013/0234521 A1 | 9/2013 | Eom et al. | |
| 2013/0264865 A1* | 10/2013 | Sugeno | H02J 5/00 307/9.1 |
| 2013/0328397 A1 | 12/2013 | Lee | |
| 2014/0091628 A1* | 4/2014 | Thompson | H02J 7/35 307/66 |
| 2015/0229131 A1* | 8/2015 | Gerhardinger | H02J 3/385 307/22 |

FOREIGN PATENT DOCUMENTS

| | | | |
|---|---|---|---|
| JP | 2012075224 A | 4/2012 |
| KR | 20110014027 A | 2/2011 |
| KR | 20120110478 A | 10/2012 |
| KR | 20130138611 A | 12/2013 |
| TW | 201328101 A | 7/2013 |
| WO | 2007018830 A | 2/2007 |
| WO | 2013004067 A | 1/2013 |

* cited by examiner

| Converters connected to Bus 240 | Converters connected to Bus 250 | Min AC Output | Max AC Output | Energy Storage Power |
|---|---|---|---|---|
| 4 | 0 | 0PU | 4PU | 0PU |
| 3 | 1 | 1PU | 3PU | +/-1PU |
| 2 | 2 | 2PU | 2PU | +/-2PU |
| 1 | 3 | 1PU | 1PU | -3PU to +1PU |
| 0 | 4 | 0PU | 0PU | -4PU to 0PU |

FIG. 4

HYBRID POWER CONVERTER FOR RENEWABLE ENERGY POWER PLANT

BACKGROUND OF THE INVENTION

Field of the Invention

The prevent disclosure relates to power conversion for a renewable energy site. More particularly, the present disclosure relates to a hybrid power converter system that is configured to provide connections of three different power buses together. The power buses may include a power bus for a DC power source, a power bus for an AC load, and a power bus for an energy storage unit. Embodiments of the disclosure may also include a renewable energy site comprising the hybrid power converter system and a method of energy conversion at a renewable energy site.

Description of Related Art

By way of background, the following patents and patent applications are each hereby incorporated by reference in their entireties: Chinese Patent Application Nos. CN 102769302 and CN 103296695; Japanese Patent Application No. JP 2012075224; Korean Patent Application Nos. KR 20110014027, KR 20120110478, and KR 20130138611; Taiwanese Patent Application No. TW 201328101; U.S. Patent Application Nos. US 20090189445, US 20110095606, US 20110137481, US 20120013190, US 20120013192, US 20120313436, US 20130051105, US 20130234521, and US 20130328397; U.S. Pat. No. 7,411,308, U.S. Pat. No. 8,344,550, and U.S. Pat. No. 8,482,155; and PCT Application Nos. WO 2013004067 and WO 2007018830.

Renewable energy sources like solar power plants are subject to unpredictable power output due to changes in the environment in their vicinity. Chief among these are the movement of clouds which can rapidly cause their power output to fluctuate. As the percentage of power from such plants supplied to the public power grid increases the severity of the problem also increases. Recently, power utilities are demanding that new solar power plants be designed with features to prevent their output from changing faster than a specified rate.

There are two methods to meet these new requirements. The first and most common approach is to include some type of energy storage or generation capability within the scope of the power plant. These include battery systems or diesel generators which can supplement the power produced by the plant when cloud events occur such that the power output remains within the required specifications. While technically straightforward this approach severely affects the economic viability of the project due to the high cost of the storage element or resistance to application of diesel generators. The second and less common approach is to forecast weather in such a way that the output of the plant can be gradually changed in advance of when cloud cover would appear. The above methods can be applied independently or in combination in varying degrees.

Previous approaches of the power storage method have required some form of power conversion. Power conversion allows power flow from power sources and loads which have much different characteristics. In particular, voltage and frequency often do not match between a power source and a power load. In addition, different loads may have different characteristics. In systems with three power buses, typically two power converters must be applied to connect the three buses- one converter to convert power between the renewable source and the AC grid and a second converter between the AC grid and the energy storage element, often a battery bank. One problem with this approach is that it requires two converters and the infrastructure to connect them to the AC grid. This effectively doubles the cost of the converter hardware. Thus, there is a need in the art for improved systems and methods for power conversion at renewable energy sites.

SUMMARY OF THE INVENTION

The present disclosure provides a hybrid power converter system that provides a practical means to allow power conversion among three power buses each of which have different characteristics. The topology of the system has the advantage of providing a single power converter capable of causing power to flow among the three different power buses. The present disclosure has particular application for renewable energy power plants where systems often incorporate energy storage elements.

Included in embodiments is a hybrid power converter for connecting at least three power buses, the hybrid power converter comprising:

a power bridge capable of producing AC power from a DC bus supplied by a renewable power source;

an energy storage element;

a switch for isolating the power bridge from an AC power bus;

a switch for isolating the power bridge from the energy storage element;

a controller for sequencing the switches according to the amount of power available from the renewable resource.

Such embodiments can also incorporate more than one power bridge operating in parallel.

Another embodiment of the present disclosure is a hybrid power converter system for connecting at least three different power buses, the system comprising a power converter or power bridge capable of producing AC power from a DC bus supplied by a renewable power source, an energy storage element, a switch for isolating the power converter from the AC power bus, a switch for isolating the power converter from the power storage element, and optionally a controller for sequencing the switches according to the amount of power available from the renewable resource. The power converter system may further comprise more than one power converter operating in parallel.

Another embodiment of the present disclosure is a hybrid power converter system for connecting at least three different power buses, comprising a first, second, and third power bus. The first power bus may be connected to a DC power source, the second power bus may be connected to an AC load, and the third power bus may be connected to an energy storage element. The hybrid power converter system may further comprise a first power converter connected to the first power bus and capable of connection with the second and third power buses and capable of producing AC power from the DC power supplied by the first power bus, a first switch capable of connecting or disconnecting the first power converter to or from the second power bus, a second switch capable of connecting or disconnecting the first power converter to or from the third power bus, and optionally a controller operable for sequencing the first and second switches according to the amount of power available from the DC power source.

Further, any embodiment of the system of this disclosure may comprise a plurality of power converters operating in parallel. One embodiment may comprise a second power converter connected to the first power bus in parallel with the first power converter, the second power converter having the same or different capabilities as the first power converter and being connected to a third switch capable of connecting or disconnecting the second power converter to or from the second power bus and a fourth switch capable of connecting or disconnecting the second power converter to or from the third power bus. Another embodiment may comprise a third power converter connected to the first power bus in parallel with the first and second power converter, the third power converter having the same or different capabilities as the first and/or second power converters and being connected to a fifth switch capable of connecting or disconnecting the third power converter to or from the second power bus and a sixth switch capable of connecting or disconnecting the third power converter to or from the third power bus. Another embodiment may comprise a fourth power converter connected to the first power bus in parallel with the first, second, and third power converters, the fourth power converter having the same or different capabilities as the first, second, and/or third power converters and being connected to a seventh switch capable of connecting or disconnecting the fourth power converter to or from the second power bus and an eighth switch capable of connecting or disconnecting the fourth power converter to or from the third power bus. Another embodiment may comprise one or more additional power converters connected to the first power bus in parallel with the first, second, third, and/or fourth power converters, each additional power converter capable of connection with the second and third power buses and capable of producing AC power from the DC power supplied by the first power bus, and each additional power converter being connected to an additional pair of switches capable of connecting or disconnecting the additional power converter with the second and third power buses. Generally, in embodiments, when one switch to a power converter is open the other switch is closed, such that power only flows through either the second or third power bus from that power converter. Further, in any of the embodiments provided by this disclosure, the controller may be operable to sequence one or more or all of the switches according to the amount of power available from the DC power source.

In any embodiment of this disclosure, the DC power source may comprise one or more photovoltaic modules at a solar energy site or one or more turbines at a wind or tidal energy site. Likewise, in any embodiment of this disclosure, one or more or each power converter may comprise an inverter.

An additional embodiment of this disclosure includes a renewable energy site comprising a hybrid power converter of this disclosure.

An additional embodiment of this disclosure includes a method of energy conversion at a renewable energy site, comprising sequencing the first and second switches of the hybrid power converter system of this disclosure according to the amount of power available from the DC power source such that when the power available from the DC power source is reduced, the first switch is activated to disconnect the first power converter from the second power bus and the second switch is activated to connect the first power converter to the third power bus, wherein the sequencing is performed by a computer processor.

In an embodiment, the hybrid power converter system further comprises one or more additional converters connected to the first power bus in parallel with the first converter wherein each additional converter has an additional pair of switches capable of connecting or disconnecting the additional converter with the second and third power buses, wherein the method further comprises sequencing the additional pair of switches according to the amount of power available from the DC power source.

Specific embodiments of this disclosure include Aspect 1, which is a hybrid power converter system comprising:

a DC power source, such as one or more photovoltaic (PV) module;

a DC bus;

a three phase power converter for converting DC power to AC power, wherein the power converter is operably connected with a first power bus comprising the DC power source and the DC bus;

wherein the power converter is operably connected by a first switch S1 with a second power bus comprising a transformer, and is operably connected by a second switch S2 with a third power bus comprising an energy storage device, provided that, during use, no more than one of switch S1 or S2 is open;

such that, during use, when switch S1 is open and switch S2 is closed, power is capable of being delivered from the DC power source to the transformer, and when switch S2 is open and switch S1 is closed, power is capable of being delivered from the DC power source to the energy storage device.

Aspect 2 comprises the system of Aspect 1, wherein the DC power source is a device for converting a renewable energy source into DC power.

Aspect 3 comprises the system of Aspect 1 or 2, wherein the device for converting a renewable energy source into DC power is one or more PV modules.

Aspect 4 comprises the system of any of Aspects 1-3, wherein the device for converting a renewable energy source into DC power is a photovoltaic (PV) array of photovoltaic modules.

Aspect 5 comprises the system of any of Aspects 1-4, wherein the PV array comprises PV modules connected in series and parallel relative to one another.

Aspect 6 is the system of any of aspects 1-5, further comprising a controller operably configured for sequencing switches S1 and S2 during use according to an amount of power available from the DC power source.

Aspect 7 is a hybrid power converter system comprising:

a first power bus comprising one or more photovoltaic modules operably connected with a DC bus;

a first and a second three phase power converter, each configured for converting DC power to AC power, and operably connected in parallel with the first power bus;

a second power bus with one or more transformer and operably connected to the first and second three phase power converters, each by a switch;

a third power bus with one or more energy storage device and operably connected to the first and second three phase power converters, each by a switch;

provided that, during use, no more than one switch between the first power converter and the second or third power bus is open, and no more than one switch between the second power converter and the second or third power bus is open;

such that, during use, when a switch between the second power bus and the first or second power converters is open, power can be delivered from the photovoltaic modules through the second power bus to an AC load, and when a switch between the third power bus and the first or second power converters is open, power is capable of being delivered from the energy storage device through the third power bus to an AC load to supplement or replace power from the photovoltaic modules.

Aspect 8 is the system of Aspect 7, wherein the one or more photovoltaic modules comprises a photovoltaic (PV) array comprising a plurality of PV modules connected in series and in parallel relative to one another.

Aspect 9 is the system of Aspect 7 or 8, further comprising a controller operably configured for sequencing the switches during use according to an amount of power available from the photovoltaic modules.

Aspect 10 is the system of any of Aspects 7-9, further comprising:

one or more additional power converters operably connected to the first power bus in parallel with the first and second power converters;

wherein each of the one or more additional power converters is operably connected to the second power bus by a switch and to the third power bus by a switch;

provided that, during use, no more than one (meaning only one or none) switch between the additional power converter and the second or third power bus is open, and no more than one (meaning only one or none) switch between the additional power converter and the second or third power bus is open;

wherein during use, power is capable of being delivered to an AC load:

from the photovoltaic modules through the second power bus and any one or more of the first, second, or additional power converters when a switch between the first, second, or additional power converter and the transformer is open; and/or from the energy storage device through the third power bus and any one or more of the first, second, or additional power converters when a switch between the first, second, or additional power converter and the energy storage device is open.

Aspect 11 is the system of any of Aspects 7-10, further comprising a controller operably configured for sequencing the switches during use according to an amount of power available from the photovoltaic modules.

Aspect 12 is the system of any of Aspects 7-11 comprising:

a first and a second three phase power converter and two additional power converters for a total of four power converters;

wherein each of the four power converters is operably connected to the first power bus in parallel with one another;

wherein the power converters each have an identical rated power (PU);

such that, during use, the system is capable of a minimum AC output, a maximum AC output, and an energy storage power as follows:

a) with the switch of each power converter open to the second power bus and no switch open between any of the power converters and the third power bus, the system is capable of a minimum AC output of 0 PU, a maximum AC output of 4 PU, and an energy storage power of 0 PU;

b) with the switch of three power converters open to the second power bus and the switch of one power converter open to the third power bus, the system is capable of a minimum AC output of 1 PU, a maximum AC output of 3 PU, and an energy storage power of +/−1 PU;

c) with the switch of two power converters open to the second power bus and the switch of two power converters open to the third power bus, the system is capable of a minimum AC output of 2 PU, a maximum AC output of 2 PU, and an energy storage power of +/−2 PU;

d) with the switch of one power converter open to the second power bus and the switch of three power converters open to the third power bus, the system is capable of a minimum AC output of 1 PU, a maximum AC output of 1 PU, and an energy storage power of −3 PU to +1 PU;

e) with no switch open between any of the power converters and the second power bus and the switch of each power converter open to the third power bus, the system is capable of a minimum AC output of 0 PU, a maximum AC output of 0 PU, and an energy storage power of −4 PU to 0 PU.

Aspect 13 is the system of any of Aspects 7-12, further comprising a controller operably configured for sequencing the switches during use according to an amount of power available from the photovoltaic modules.

Aspect 14 is the system of any of Aspects 1-13, wherein the DC power source comprises one or more photovoltaic modules at a solar energy site, one or more turbines at a wind energy site, or one or more turbines at a tidal energy site.

Aspect 15 is a method of managing energy provided from a power source, such as a DC power source, to an AC load comprising:

monitoring an amount of power available from a DC power source connected with a first power bus to identify change or potential change in power output;

in response to identifying a reduced amount of power from the DC power source, closing a switch between a power converter, which power converter is connected with the first power bus, and a second power bus comprising a transformer; and opening a switch between that power converter and a third power bus comprising one or more energy storage devices; and allowing power to flow to an AC load from the energy storage devices.

Aspect 16 is the method of Aspect 15, wherein the first power bus is part of a hybrid power converter system further comprising:

a DC power source;

a DC bus;

a three phase power converter for converting DC power to AC power;

wherein the power converter is operably connected with the first power bus which comprises the DC power source and the DC bus;

wherein the power converter is operably connected by a first switch S1 with a second power bus comprising a transformer, and is operably connected by a second switch S2 with a third power bus comprising an energy storage device, provided that, during use, no more than one of switch S1 or S2 is open;

such that, during use, when switch S1 is open and switch S2 is closed, power is capable of being delivered from the DC power source to the transformer, and when switch S2 is open and switch S1 is closed, power is capable of being delivered from the DC power source to the energy storage device.

Aspect 17 is the method of Aspect 15 or 16, wherein the first power bus comprises one or more photovoltaic modules operably connected with a DC bus, and wherein the first power bus is part of a hybrid power converter system further comprising:

a first and a second three phase power converter, each configured for converting DC power to AC power, and operably connected in parallel with the first power bus;

a second power bus comprising one or more transformer and operably connected to the first and second three phase power converters, each by a switch;

a third power bus with one or more energy storage device and operably connected to the first and second three phase power converters, each by a switch;

provided that, during use, no more than one switch between the first power converter and the second or third power bus is open, and no more than one switch between the second power converter and the second or third power bus is open;

such that, during use, when a switch between the second power bus and the first or second power converters is open, power is capable of being delivered from the photovoltaic modules through the second power bus to an AC load, and when a switch between the third power bus and the first or second power converters is open, power is capable of being delivered from the energy storage device through the third power bus to an AC load to supplement or replace power from the PV modules.

Aspect 18 is the method of any of Aspects 15-17, wherein the hybrid power converter system further comprises:

a first and a second three phase power converter and two additional power converters for a total of four power converters;

wherein each of the four power converters is operably connected to the first power bus in parallel with one another;

wherein the power converters each have an identical rated power (PU);

such that, during use, the system is capable of a minimum AC output, a maximum AC output, and an energy storage power as follows:

a) with the switch of each power converter open to the second power bus and no switch open between any of the power converters and the third power bus, the system is capable of a minimum AC output of 0 PU, a maximum AC output of 4 PU, and an energy storage power of 0 PU;

b) with the switch of three power converters open to the second power bus and the switch of one power converter open to the third power bus, the system is capable of a minimum AC output of 1 PU, a maximum AC output of 3 PU, and an energy storage power of +/−1 PU;

c) with the switch of two power converters open to the second power bus and the switch of two power converters open to the third power bus, the system is capable of a minimum AC output of 2 PU, a maximum AC output of 2 PU, and an energy storage power of +/−2 PU;

d) with the switch of one power converter open to the second power bus and the switch of three power converters open to the third power bus, the system is capable of a minimum AC output of 1 PU, a maximum AC output of 1 PU, and an energy storage power of −3 PU to +1 PU;

e) with no switch open between any of the power converters and the second power bus and the switch of each power converter open to the third power bus, the system is capable of a minimum AC output of 0 PU, a maximum AC output of 0 PU, and an energy storage power of −4 PU to 0 PU.

Aspect 19 is the method of any of Aspects 15-18, wherein the method comprises opening or closing the switches using a computer processor.

Aspect 20 is the method of any of Aspects 15-19, wherein the monitoring comprises one or more of forecasting weather in a vicinity of the DC power source, measuring power output of the DC power source, or a combination of both.

BRIEF DESCRIPTION OF THE DRAWINGS

The accompanying drawings illustrate aspects of embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

As used in the context of this disclosure, the terms "power bridge" and "power converter" may be used interchangeably.

Also as used in this disclosure, the term energy storage element may also be referred to as a power storage element, or an energy storage device, or a power storage device. Such storage elements/devices can also be referred to as a battery bank comprising one or a plurality of such storage elements/devices.

Figure 1:
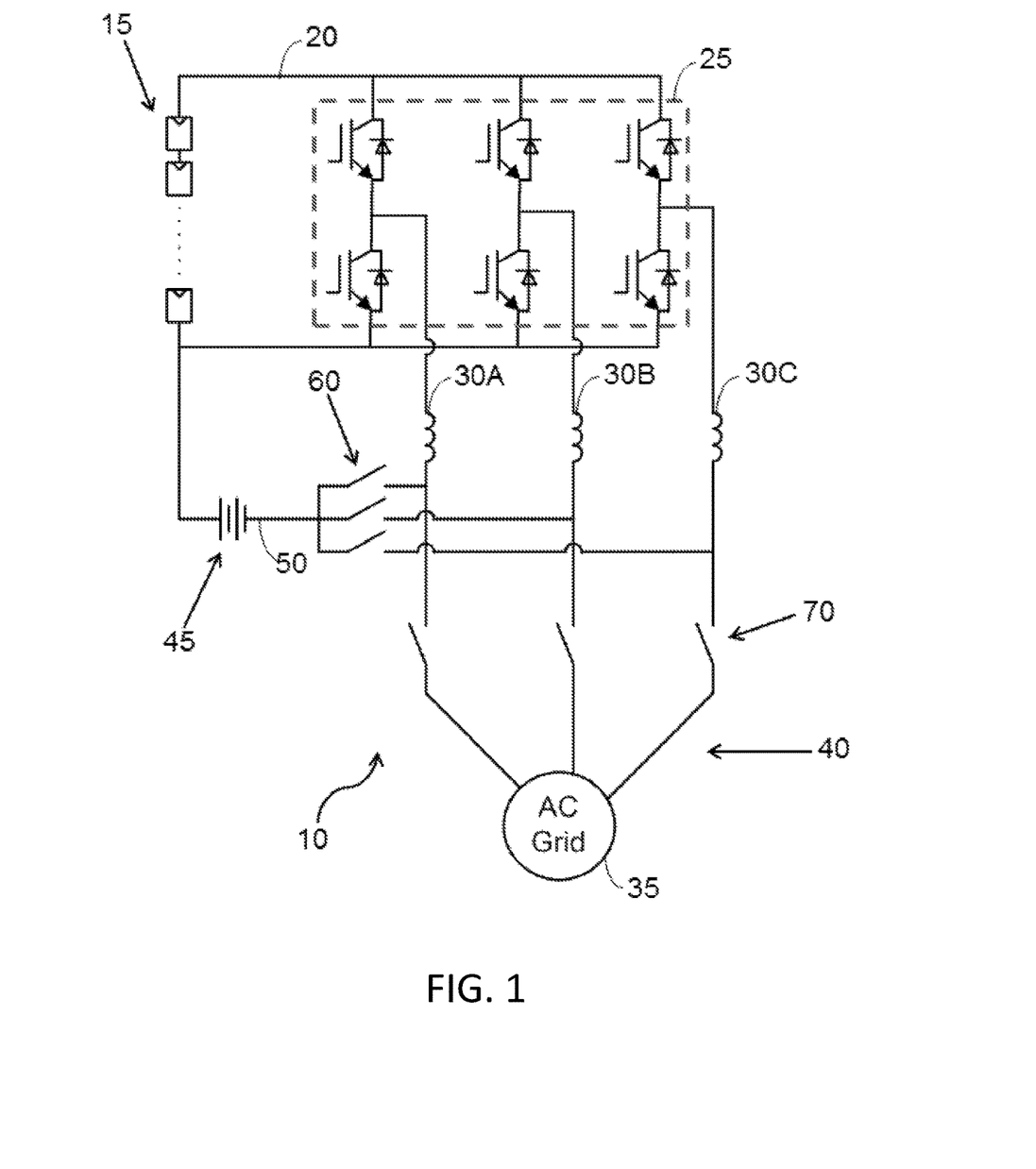
FIG. 1 is a schematic diagram of a hybrid power conversion system having one power converter according to an embodiment of this disclosure.

FIG. 1 shows an embodiment of a hybrid power converter system 10 of the present disclosure with three power buses. The first power bus 15 is an array of DC power sources, such as photovoltaic modules, organized in series and parallel and feeding a DC bus 20 which supplies of a three phase power converter 25.

The output of the power converter 25 is attached/connected either to transformers 30A-30C for each phase or to a battery bank 45 by respectively switch 70 and switch 60. When switch 60 is closed and switch 70 is open power can flow from the PV array 15 to the transformers 30A-30C and to the AC grid 35 through the AC power bus 40. When switch 60 is open and switch 70 is closed then power can flow from the PV array 15 to the battery bank 45 through battery bus 50. In embodiments, no more than one of switch 60 and 70 are open during use of the system. Power converter 25 shown can cause power to flow in both directions, but since the PV array 15 cannot itself absorb power this is possible in the configuration shown.

Figure 2:
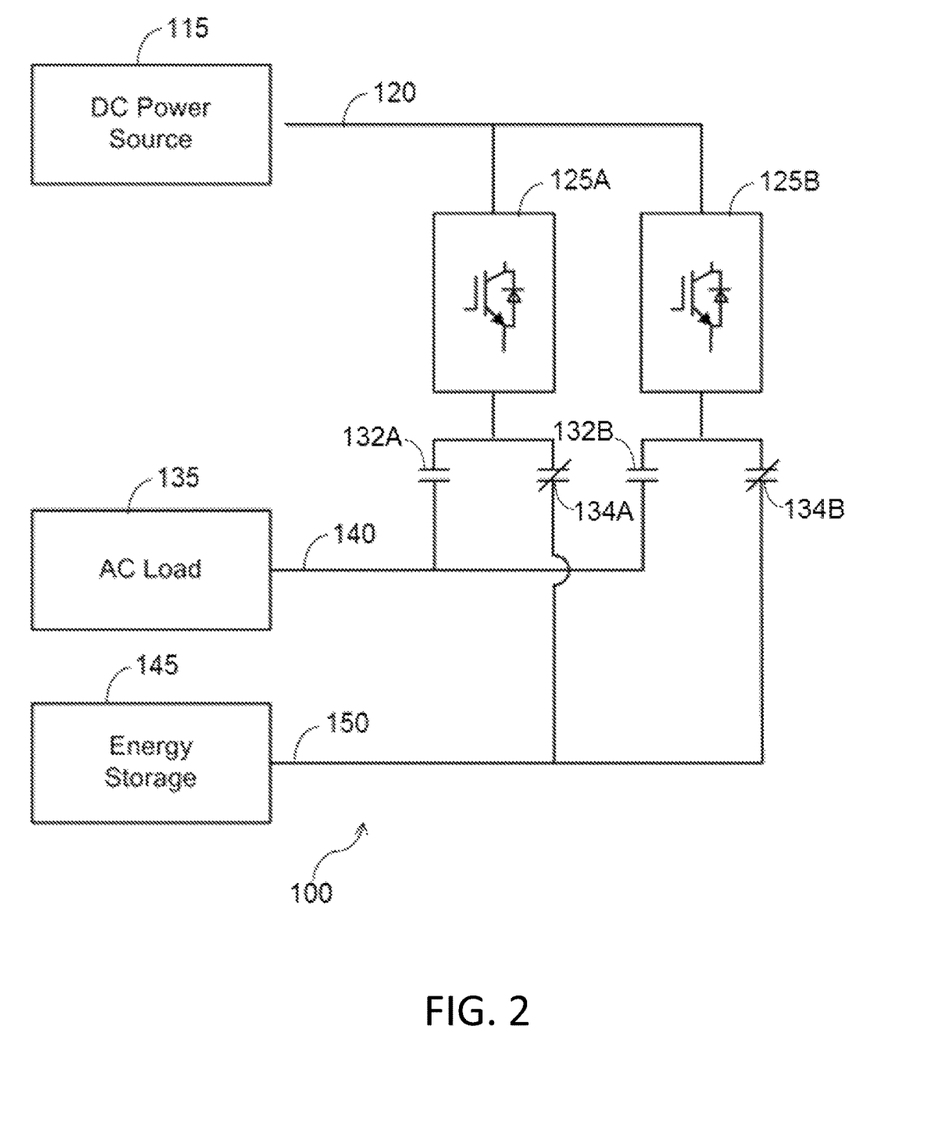
FIG. 2 is a schematic diagram of a hybrid power conversion system with two power converters connected in parallel according to this disclosure.

Now considering the embodiment shown in FIG. 2, once a plurality of power converters themselves are connected in parallel there is more flexibility for how power can flow through the system. In this configuration 100 two converters 125A and 125B are attached in parallel, each potentially connected to all of the three separate power buses 120, 140, 150. In the context of this disclosure, when referring to a connection between the power converters and a power bus, there is a switch between the two providing what may be referred to herein as a connection or potential connection, since when the switch is open, power can flow through the power converter to the power bus and when the switch is closed, there is no such power flow. When both converters 125A and 125B are connected to the AC load 135 through AC power bus 140 then the total power that can flow from the DC power source 115 to the AC load 135 is the sum of the ratings of each converter. When power from the DC power source 115 is available, then one or both converters 125A and 125B may be connected to the AC load 135 through switches 132A and 132B, wherein switches 132A and 132B are open and switches 134A and 134B are closed. If the power available from the DC source 115 is reduced, such as due to a lack of availability of the renewable resource, then one of the converters 125A and 125B can be connected to the energy storage element 145 through switch 134A or 134B, wherein one of switches 134A and 134B is open and one of corresponding switches 132A and 132B is closed. In this configuration power is passed from the energy storage power bus 150 to the DC power bus 120 to supplement the power being drawn from the renewable resource. Then the total of these two power buses 120 and 150 is delivered to the AC load 135 on AC power bus 140. In this configuration the power from the storage element 145 is limited by the rating of the converter it is attached to. In addition, the total power of both the DC power source 115 and the storage element 145 is further limited by the rating of the converter (125A or 125B) attached to the AC load 135 through AC power bus 140. When the converters are identical the power is limited to 50% but it is possible to maintain a power flow to the AC load 135 of not less than 50% of the converter rating regardless of the output of the renewable resource.

Figure 3:
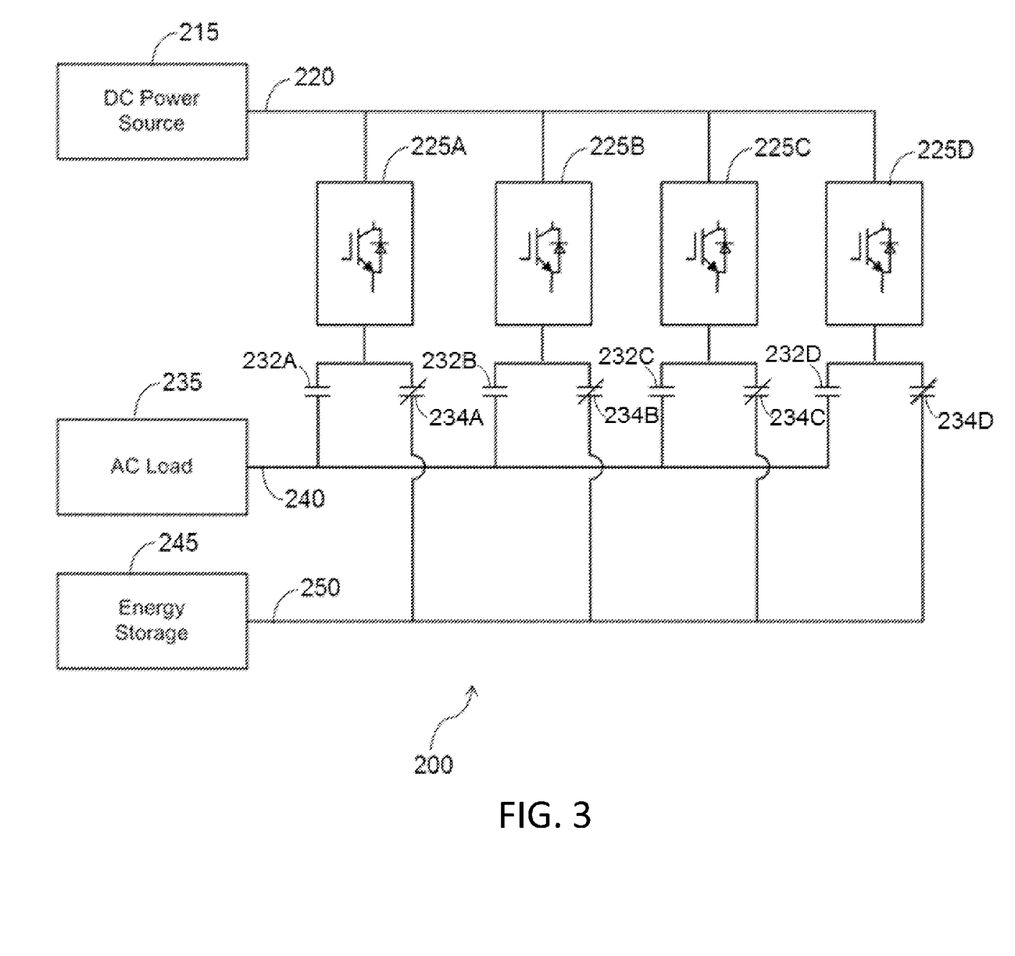
FIG. 3 is a schematic diagram of a hybrid power conversion system with four power converters connected in parallel according to this disclosure.

Now considering the embodiment of FIG. 3, when more converters are connected in parallel the system becomes even more flexible. FIG. 3 shows an embodiment 200 with four converters 225A-225D connected in parallel. The four converters 225A-225D are connected to a DC power source 215 through a DC power bus 220, an AC load 235 through AC power bus 240, and energy storage device 245 through energy storage power bus 250, in a similar configuration as FIG. 2. Switches 232A-232D are operable to connect or disconnect converters 225A-225D to or from the AC load 235 through AC power bus 240, while switches 234A-234D are operable to connect or disconnect converters 234A-234D to or from energy storage element 245 through energy storage power bus 250. In the context of this disclosure, the terms connect and disconnect may refer to physical connection/disconnection and/or to electrical connection/disconnection, for example, by a switch.

Figure 4:
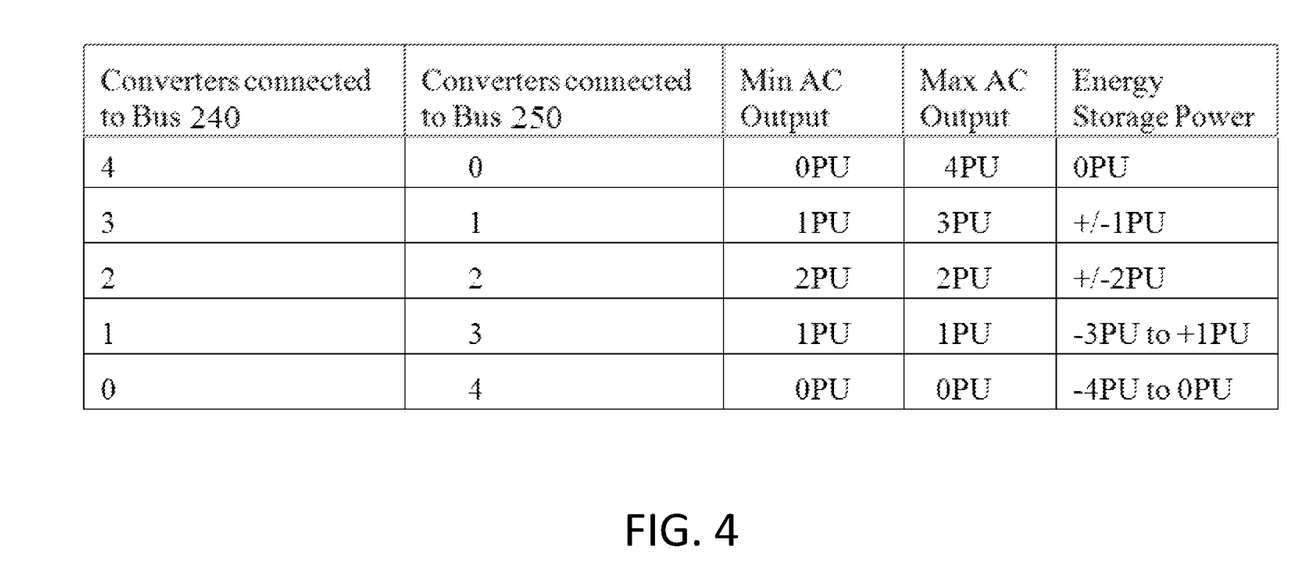
FIG. 4 is a table depicting the rated power of the converters of FIG. 3 according to their connectivity according to an embodiment of this disclosure.

In this configuration, the following combinations of converters according to their connectivity is shown in the table of FIG. 4. Assuming the converters are of identical ratings, the table shows the minimum AC output, maximum AC output, and energy storage power of the system for the particular converter combinations. In this table the notation PU means the rated power of one converter. With such a converter system there are several states available for managing the power flowing to or from each of the power buses. In particular the converter can maintain a relatively constant flow of power to the AC load while using its energy storage element to produce or absorb energy from the variable renewable resource. Indeed, one state allows the system to maintain 50% of its rated output even when no power is available from the renewable resource.

Embodiments of the hybrid power converter system of this disclosure may include a controller or controller component configured for sequencing the switches according to the amount of power available from the renewable energy source. The controller may comprise a set of computer-executable instructions stored in a computer-readable memory (which may include random-access memory (RAM) or read-only memory (ROM)) that are configured for instructing a computer processor component of the controller to provide a switching sequence based on a feedback or input of the amount of power available from the renewable energy source. The computer executable instructions may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform the switching sequence. Further, the computer-executable instructions may be based on one or more algorithms that describe the switching sequence in relation to the amount of power available from the renewable energy source. The computer-executable instructions may be written in any suitable programming language.

Embodiments of the disclosure also include a computer readable medium comprising one or more computer files comprising a set of computer-executable instructions for performing the switching sequences and operations. In exemplary embodiments, the files may be stored contiguously or non-contiguously on the computer-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" includes any kind of computer memory such as floppy disks, conventional hard disks, CD-ROM, Flash ROM, non-volatile ROM, electrically erasable programmable read-only memory (EEPROM), and RAM.

In other embodiments of the disclosure, files comprising the set of computer-executable instructions may be stored in computer-readable memory on a single computer or distributed across multiple computers. A skilled artisan will further appreciate, in light of this disclosure, how the controller component can be implemented, alternatively or in addition to software, using hardware or firmware. As such, as used herein, the switching operations of the controller can be implemented using any combination of software, hardware, or firmware.

Embodiments of the invention include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out switching operations of the disclosure. The computer or device performing the switching operations may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform the switching sequences and operations described herein.

An exemplary embodiment of the invention includes a single computer, or device that may be configured at a renewable energy site to serve as a controller component of the hybrid power converter system. The controller component may comprise at least one processor, a form of computer-readable memory; and a set of computer-executable instructions for performing the switching operations described herein. The controller component may be configured to send commands to the switches of the hybrid power converter system and receive feedback from the DC power source indicating a power level. Commands and feedback may be sent to and from the controller component through a network interface such as an Ethernet switch. However, any suitable network protocol, including IP, UDP, or ICMP, as well any suitable wired or wireless network including any local area network, Internet network, telecommunications network, Wi-Fi enabled network, or Bluetooth enabled network may be used.

The hybrid power converter system of the disclosure may be used for power conversion at any renewable energy site that is connected to the public power grid, including but not limited to solar energy sites employing one or more photovoltaic modules as the DC power source, and wind energy and tidal energy sites employing one or more turbines as the DC power source.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A hybrid power converter system comprising:
   a first power bus comprising one or more photovoltaic modules connected with a DC bus;
   a first and a second three-phase power converter, each configured for converting DC power to AC power, and connected in parallel with the first power bus;
   a second power bus connected to an AC load and/or an AC grid, and connected to each of the first and second three-phase power converters by a switch;
   a third power bus connected to one or more energy storage device and connected to each of the first and second three-phase power converters by a switch;
   provided that, during use, when one of the switches between the first three-phase power converter and the second or third power bus is open the other is closed, and when one of the switches between the second three-phase power converter and the second or third power bus is open the other is closed, whereby power is capable of being delivered from the one or more photovoltaic modules through the second power bus to the AC load and/or the AC grid, and/or power is capable of being delivered from the one or more energy storage device through the third power bus to the AC load and/or the AC grid to supplement or replace power from the one or more photovoltaic modules.

2. The system of claim 1, wherein the one or more photovoltaic modules comprises a photovoltaic (PV) array comprising a plurality of PV modules connected in series and in parallel relative to one another.

3. The system of claim 1, further comprising a controller configured for sequencing the switches during use according to an amount of power available from the one or more photovoltaic modules.

4. The system of claim 1, further comprising:
   one or more additional power converters connected to the first power bus in parallel with the first and second three-phase power converters;
   wherein each of the one or more additional power converters is connected to the second power bus by a switch and to the third power bus by a switch;
   provided that, during use, when one of the switches between the additional power converter and the second or third power bus is open the other is closed, and wherein during use, power is capable of being delivered to the AC load and/or the AC grid either:
      from the one or more photovoltaic modules through the second power bus and any one or more of the first, second, or additional power converters; and/or
      from the one or more energy storage device through the third power bus and any one or more of the first, second, or additional power converters.

5. The system of claim 4, further comprising a controller operably configured for sequencing the switches during use according to an amount of power available from the photovoltaic modules.

6. The system of claim 4 comprising:
   a first and a second three-phase power converter and two additional power converters for a total of four power converters;
   wherein each of the four power converters is connected to the first power bus in parallel with one another;
   wherein the four power converters each have an identical rated power (PU);
   such that, during use, the system is capable of a minimum AC output, a maximum AC output, and an energy storage power as follows:
   a) a minimum AC output of 0PU, a maximum AC output of 4PU, and an energy storage power of 0PU;
   b) a minimum AC output of 1PU, a maximum AC output of 3PU, and an energy storage power of +/−1PU;
   c) a minimum AC output of 2PU, a maximum AC output of 2PU, and an energy storage power of +/−2PU;
   d) a minimum AC output of 1PU, a maximum AC output of 1PU, and an energy storage power of −3PU to +1PU; or
   e) a minimum AC output of 0PU, a maximum AC output of 0PU, and an energy storage power of −4PU to 0PU.

7. The system of claim 6, further comprising a controller operably configured for sequencing the switches during use according to an amount of power available from the one or more photovoltaic modules.

8. A method of managing energy provided to an AC load and/or an AC grid, the method comprising:
  monitoring an amount of power available from one or more photovoltaic (PV) modules connected with a DC bus;
  identifying a change or potential change in power output from the one or more PV modules, wherein the one or more PV modules and the DC bus are part of a hybrid power converter system further comprising:
    a first and a second three-phase power converter, each configured for converting DC power to AC power, and connected in parallel with the DC bus;
    a second power bus connected to an AC load and/or an AC grid and each of the first and second three-phase power converters by a switch;
    a third power bus connected to one or more energy storage device and connected to each of the first and second three-phase power converters by a switch;
  in response to identifying a reduced amount of power from the one or more PV modules, directing power to flow to the AC load and/or the AC grid from the one or more energy storage device by way of the switches provided that, during use, when one of the switches between the first three-phase power converter and the second or third power bus is open the other is closed, and when one of the switches between the second three-phase power converter and the second or third power bus is open the other is closed, whereby power is capable of being delivered from the one or more PV modules through the second power bus to the AC load and/or the AC grid, and/or power is capable of being delivered from the one or more energy storage device through the third power bus to the AC load and/or the AC grid to supplement or replace power from the one or more PV modules.

9. The method of claim 8, wherein the hybrid power converter system further comprises:
  in addition to the first and second three-phase power converters, two additional power converters for a total of four power converters;
  wherein each of the four power converters is connected to the first power bus in parallel with one another;
  wherein the four power converters each have an identical rated power (PU);
  such that, during use, the system is capable of a minimum AC output, a maximum AC output, and an energy storage power as follows:
    a) a minimum AC output of 0PU, a maximum AC output of 4PU, and an energy storage power of 0PU;
    b) a minimum AC output of 1PU, a maximum AC output of 3PU, and an energy storage power of +/−1PU;
    c) a minimum AC output of 2PU, a maximum AC output of 2PU, and an energy storage power of +/−2PU;
    d) a minimum AC output of 1PU, a maximum AC output of 1PU, and an energy storage power of −3PU to +1PU; or
    e) a minimum AC output of 0PU, a maximum AC output of 0PU, and an energy storage power of −4PU to 0PU.

10. The method of claim 8, wherein the method comprises opening or closing the switches using a computer processor.

11. The method of claim 8, wherein the monitoring comprises one or more of forecasting weather in a vicinity of the DC power source, measuring power output of the DC power source, or a combination of both.

* * * * *